(12) United States Patent
Doyle et al.

(10) Patent No.: US 9,636,699 B2
(45) Date of Patent: *May 2, 2017

(54) METHOD AND APPARATUS FOR DISPENSING A VISCOUS MATERIAL ON A SUBSTRATE

(71) Applicant: Illinois Tool Works Inc., Glenview, IL (US)

(72) Inventors: Dennis G. Doyle, Shrewsbury, MA (US); Ronald J. Forget, Douglas, MA (US); Thomas C. Prentice, Westford, MA (US); Patsy A. Mattero, Smithfield, RI (US)

(73) Assignee: Illinois Tool Works Inc., Glenview, IL (US)

( * ) Notice: Subject to any disclaimer, the term of this patent is extended or adjusted under 35 U.S.C. 154(b) by 134 days.

This patent is subject to a terminal disclaimer.

(21) Appl. No.: 14/842,182

(22) Filed: Sep. 1, 2015

(65) Prior Publication Data

US 2015/0367376 A1 Dec. 24, 2015

Related U.S. Application Data

(62) Division of application No. 13/801,421, filed on Mar. 13, 2013, now Pat. No. 9,144,818.

(51) Int. Cl.
*B05B 1/34* (2006.01)
*B05C 5/02* (2006.01)
(Continued)

(52) U.S. Cl.
CPC ........ *B05C 5/0225* (2013.01); *B05C 11/1034* (2013.01); *G01F 11/021* (2013.01)

(58) Field of Classification Search
CPC ....... H05K 13/0469; H05K 2203/0126; H05K 3/3478; H05K 3/1241; H05K 3/0091;
(Continued)

(56) References Cited

U.S. PATENT DOCUMENTS 3,923,205 A 12/1975 Ohlin
5,044,900 A 9/1991 Cavallaro
(Continued)

FOREIGN PATENT DOCUMENTS

DE 4313161 A1 10/1993
DE 10153708 A1 5/2003
(Continued)

OTHER PUBLICATIONS

International Search Report from corresponding PCT/US2014/017228 dated Jun. 3, 2014.

*Primary Examiner* — Arthur O Hall
*Assistant Examiner* — Adam J Rogers
(74) *Attorney, Agent, or Firm* — Lando & Anastasi, LLP

(57) ABSTRACT

A dispenser, configured to dispense material on a substrate, includes a dispensing unit having a housing with a chamber, a piston disposed in the chamber and axially movable within the chamber, and a nozzle coupled to the housing. The nozzle has an orifice co-axial with the chamber of the housing. The dispenser further includes an actuator coupled to the dispensing unit and configured to drive the up- and down movement of the piston, and a compliant assembly coupled to the actuator and the piston. The compliant assembly is configured to permit limited relative travel between the actuator and the piston. A method of dispensing is further disclosed.

12 Claims, 13 Drawing Sheets

(51) Int. Cl.
   *B05C 11/10* (2006.01)
   *G01F 11/02* (2006.01)

(58) Field of Classification Search
   CPC ........... H01L 21/6715; H01L 21/67023; B05C 5/0225; B05C 11/1034; B05C 5/02; G01F 11/021; G01F 11/32; G01F 11/023
   USPC .......................................... 222/333; 239/583
   See application file for complete search history.

(56) References Cited

U.S. PATENT DOCUMENTS

| | | | |
|---|---|---|---|
| 5,795,390 A | 8/1998 | Cavallaro | |
| 5,819,983 A | 10/1998 | White et al. | |
| 5,837,892 A | 11/1998 | Cavallaro et al. | |
| 5,886,494 A | 3/1999 | Prentice et al. | |
| 5,903,125 A | 5/1999 | Prentice et al. | |
| 5,918,648 A | 7/1999 | Carr et al. | |
| 5,957,343 A | 9/1999 | Cavallaro | |
| 5,971,227 A | 10/1999 | White et al. | |
| 5,985,029 A | 11/1999 | Purcell | |
| 6,007,631 A | 12/1999 | Prentice et al. | |
| 6,017,392 A | 1/2000 | Cavallaro | |
| 6,025,689 A | 2/2000 | Prentice et al. | |
| 6,056,190 A | 5/2000 | Foulke et al. | |
| 6,082,289 A | 7/2000 | Cavallaro | |
| 6,085,943 A | 7/2000 | Cavallaro et al. | |
| 6,093,251 A | 7/2000 | Carr et al. | |
| 6,112,588 A | 9/2000 | Cavallaro et al. | |
| 6,119,895 A | 9/2000 | Fugere et al. | |
| 6,157,157 A | 12/2000 | Prentice et al. | |
| 6,170,737 B1 | 1/2001 | Foulke et al. | |
| 6,206,964 B1 | 3/2001 | Purcell et al. | |
| 6,214,117 B1 | 4/2001 | Prentice et al. | |
| 6,216,917 B1 | 4/2001 | Crouch | |
| 6,224,671 B1 | 5/2001 | Cavallaro | |
| 6,224,675 B1 | 5/2001 | Prentice et al. | |
| 6,258,165 B1 | 7/2001 | Cavallaro | |
| 6,322,854 B1 | 11/2001 | Purcell et al. | |
| 6,371,339 B1 | 4/2002 | White et al. | |
| 6,378,737 B1 | 4/2002 | Cavallaro et al. | |
| 6,391,378 B1 | 5/2002 | Carr et al. | |
| 6,395,334 B1 | 5/2002 | Prentice et al. | |
| 6,412,328 B1 | 7/2002 | Cavallaro et al. | |
| 6,427,903 B1 | 8/2002 | Foulke et al. | |
| 6,444,035 B1 | 9/2002 | Nowak et al. | |
| 6,514,569 B1 | 2/2003 | Crouch | |
| 6,540,832 B2 | 4/2003 | Cavallaro | |
| 6,541,063 B1 | 4/2003 | Prentice et al. | |
| 6,641,030 B1 | 11/2003 | Freeman et al. | |
| 6,644,238 B2 | 11/2003 | Watts et al. | |
| 6,688,458 B2 | 2/2004 | Prentice et al. | |
| 6,739,483 B2 | 5/2004 | White et al. | |
| 6,775,879 B2 | 8/2004 | Bibeault et al. | |
| 6,814,810 B2 | 11/2004 | Prentice et al. | |
| 6,866,881 B2 | 3/2005 | Prentice et al. | |
| 6,902,052 B2 | 6/2005 | Prentice et al. | |
| 6,932,280 B2 | 8/2005 | Crouch | |
| 7,404,861 B2 | 7/2008 | Prentice et al. | |
| 7,833,572 B2 | 11/2010 | Read | |
| 7,923,056 B2 | 4/2011 | Read | |
| 7,980,197 B2 | 7/2011 | Prentice et al. | |
| 8,136,705 B2 | 3/2012 | Tracy et al. | |
| 8,230,805 B2 | 7/2012 | Read | |
| 8,424,720 B2 | 4/2013 | Tracy et al. | |
| 2003/0100824 A1 | 5/2003 | Warren et al. | |
| 2003/0132243 A1* | 7/2003 | Engel | H05K 13/046 222/61 |
| 2003/0209560 A1 | 11/2003 | Hui et al. | |
| 2005/0158467 A1 | 7/2005 | Buckley et al. | |
| 2005/0230494 A1 | 10/2005 | Lucas et al. | |
| 2006/0193969 A1 | 8/2006 | Prentice et al. | |
| 2007/0069041 A1* | 3/2007 | Quinones | H05K 13/046 239/71 |
| 2008/0105703 A1 | 5/2008 | Prentice et al. | |
| 2008/0159617 A1 | 7/2008 | Yang et al. | |
| 2009/0107398 A1 | 4/2009 | Hassler, Jr. et al. | |
| 2010/0258592 A1* | 10/2010 | Tracy | F04B 15/02 222/333 |
| 2012/0240658 A1 | 9/2012 | Tracy | |
| 2013/0052359 A1* | 2/2013 | Ahmadi | B05C 5/0225 427/421.1 |
| 2013/0133574 A1 | 5/2013 | Doyle et al. | |
| 2013/0136850 A1 | 5/2013 | Doyle et al. | |
| 2013/0177702 A1 | 7/2013 | Crouch et al. | |
| 2013/0214452 A1 | 8/2013 | Choi et al. | |

FOREIGN PATENT DOCUMENTS

| | | |
|---|---|---|
| EP | 1 937 045 A1 | 6/2008 |
| EP | 2561931 A2 | 2/2013 |
| WO | 00/65316 A1 | 11/2000 |

* cited by examiner

METHOD AND APPARATUS FOR DISPENSING A VISCOUS MATERIAL ON A SUBSTRATE

RELATED APPLICATIONS

This application is a divisional of pending U.S. patent application Ser. No. 13/801,421, filed Mar. 13, 2013, entitled METHOD AND APPARATUS FOR DISPENSING A VISCOUS MATERIAL ON A SUBSTRATE, which is incorporated herein by reference in its entirety.

BACKGROUND OF THE DISCLOSURE

1. Field of the Invention

The invention relates generally to methods and apparatus for dispensing a viscous material on a substrate, such as a printed circuit board.

2. Discussion of Related Art

There are several types of prior art dispensing systems or dispensers used for dispensing metered amounts of liquid or paste for a variety of applications. One such application is the assembly of integrated circuit chips and other electronic components onto circuit board substrates. In this application, automated dispensing systems are used for dispensing dots of liquid epoxy or solder paste, or some other related material, onto circuit boards. Automated dispensing systems are also used for dispensing lines of underfill materials and encapsulants, which mechanically secure components to the circuit board. Underfill materials and encapsulants are used to improve the mechanical and environmental characteristics of the assembly.

Another application is to dispense very small amounts or dots onto a circuit board. In one system capable of dispensing dots of material, a dispenser unit utilizes a rotating auger having a helical groove to force material out of a nozzle and onto a circuit board. One such system is disclosed in U.S. Pat. No. 5,819,983, entitled LIQUID DISPENSING SYSTEM WITH SEALING AUGERING SCREW AND METHOD FOR DISPENSING, which is owned by Speedline Technologies, Inc. of Franklin, Mass., a subsidiary of the assignee of the present disclosure.

In an operation employing an auger-type dispenser, the dispenser unit is lowered towards the surface of the circuit board prior to dispensing a dot or a line of material onto the circuit board and raised after dispensing the dot or line of material. Using this type of dispenser, small, precise quantities of material may be placed with great accuracy. The time required to lower and raise the dispenser unit in a direction normal to the circuit board, typically known as a z-axis movement, can contribute to the time required to perform dispensing operations. Specifically, with auger-type dispensers, prior to dispensing the dot or line of material, the dispenser unit is lowered so that the material touches or "wets" the circuit board. The process of wetting contributes to additional time to perform the dispensing operation.

It is also known in the field of automated dispensers to launch dots of viscous material toward the circuit board. In such a system, a minute, discrete quantity of viscous material is ejected from a nozzle with sufficient inertia to enable the material to separate from the nozzle prior to contacting the circuit board. As discussed above, with the auger-type application or other prior, traditional dispensing systems, it is necessary to wet the circuit board with the dot of material to enable the material to adhere to the circuit board such that when the dispenser is pulled away the dot of material will release from the nozzle. When ejecting, the dots may be deposited on the substrate without wetting as a pattern of discrete dots, or alternatively the dots may be placed sufficiently close to each other to cause them to coalesce into more or less a continuous pattern. An example of such a system is disclosed in U.S. Pat. No. 7,980,197, entitled METHOD AND APPARATUS FOR DISPENSING A VISCOUS MATERIAL ON A SUBSTRATE, which is owned by Illinois Tool Works Inc. of Glenview, Ill., the assignee of the present disclosure.

SUMMARY OF THE DISCLOSURE

One aspect of the disclosure is directed to a dispenser configured to dispense material on a substrate. In one embodiment, the dispenser comprises a dispensing unit including a housing having a chamber, a piston disposed in the chamber and axially movable within the chamber, and a nozzle coupled to the housing. The nozzle has an orifice co-axial with the chamber of the housing. The dispenser further comprises an actuator coupled to the dispensing unit and configured to drive the up- and down movement of the piston, and a compliant assembly coupled to the actuator and the piston. The compliant assembly is configured to permit limited relative travel between the actuator and the piston.

Embodiments of the dispenser further may include a sensor to sense a position of the actuator. The dispenser further may include a sensor to sense a position of the piston. The dispenser further may include a controller for controlling the actuator. The controller may be configured to perform a feed-forward adaptive routine. The controller further may be configured to utilize sensor data from the sensor and the feed-forward adaptive routine to control motion of the actuator to achieve a desired actuator motion profile. The compliant assembly further may be configured to bias a length of the compliant assembly to an extended position. The compliant assembly may include a housing coupled to the actuator and a plunger disposed within the housing at a lower end of the housing, with the plunger being biased to an extended position. The compliant assembly further may include a spring disposed between the housing and the plunger, with the spring being configured to bias the plunger to the extended position. The plunger of the compliant assembly may be configured to apply a downward bias on the piston, and, during a downward stroke of the piston, the plunger engages the piston and the spring is compressed within the housing. In one embodiment, the actuator may be a piezoelectric actuator assembly. In another embodiment, the actuator may be a voice coil motor. In one embodiment, the piston stops when a tip of the piston engages a seat, and the compliant assembly permits further travel of the actuator subsequent to the engagement of the piston against the seat. In another embodiment, the piston stops when a feature of the piston engages a stop, and the compliant assembly permits further travel of the actuator subsequent to the engagement of the piston against the stop. The compliant assembly may have a stiffness of compliance, with the compliant assembly being configured to vary a stiffness of compliance as a function of relative motion between the actuator and the piston.

Another aspect of the disclosure is directed to a method of operating a dispenser to dispense material on a substrate. In one embodiment, the dispenser comprises a dispensing unit including a housing having a chamber, a piston disposed in the chamber and axially movable within the chamber, and a nozzle coupled to the housing, the nozzle having an orifice co-axial with the chamber of the housing, and an actuator coupled to the dispensing unit and configured to drive the up- and down movement of the piston. The method comprises permitting limited relative travel between the actuator and the piston.

Embodiments of the method further include biasing a length of the compliant assembly to an extended position. The method further may include varying a stiffness of compliance as a function of relative motion between the actuator and the piston. The method further may include sensing a position of the actuator and/or sensing a position of the piston. The method further may include controlling the actuator by providing a feed-forward adaptive routine to utilize sensor data from the sensor and the feed-forward adaptive routine to control motion of the actuator to achieve a desired actuator motion profile.

BRIEF DESCRIPTION OF THE DRAWINGS

For a better understanding of the disclosure, reference is made to the figures which are incorporated herein by reference and in which.

DETAILED DESCRIPTION OF THE PREFERRED EMBODIMENTS

Figure 1:
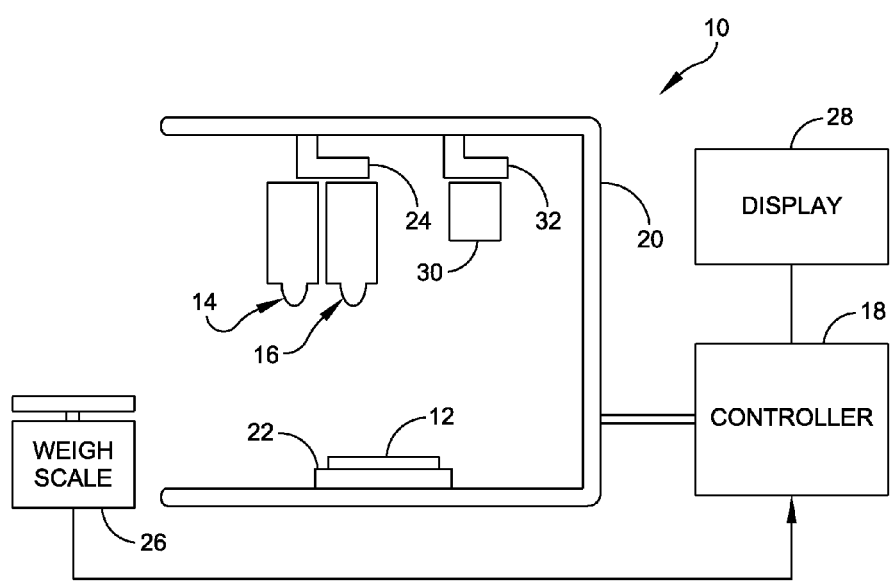
FIG. 1 is a schematic view of a dispenser of an embodiment of the disclosure.

For the purposes of illustration only, and not to limit the generality, the disclosure will now be described in detail with reference to the accompanying figures. This disclosure is not limited in its application to the details of construction and the arrangement of components set forth in the following description or illustrated in the drawings. The disclosure is capable of other embodiments and of being practiced or being carried out in various ways. Also the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

FIG. 1 schematically illustrates a dispenser, generally indicated at 10, according to one embodiment of the present disclosure. The dispenser 10 is used to dispense a viscous material (e.g., an adhesive, encapsulant, epoxy, solder paste, underfill material, etc.) or a semi-viscous material (e.g., soldering flux, etc.) onto an electronic substrate 12, such as a printed circuit board or semiconductor wafer. The dispenser 10 may alternatively be used in other applications, such as for applying automotive gasketing material or in certain medical applications. It should be understood that references to viscous or semi-viscous materials, as used herein, are exemplary and intended to be non-limiting. The dispenser 10 includes first and second dispensing units or heads, generally indicated at 14 and 16, respectively, and a controller 18 to control the operation of the dispenser. Although two dispensing units are shown, it should be understood that one or more dispensing units may be provided.

The dispenser 10 may also include a frame 20 having a base or support 22 for supporting the substrate 12, a dispensing unit gantry 24 movably coupled to the frame 20 for supporting and moving the dispensing units 14, 16, and a weight measurement device or weigh scale 26 for weighing dispensed quantities of the viscous material, for example, as part of a calibration procedure, and providing weight data to the controller 18. A conveyor system (not shown) or other transfer mechanism, such as a walking beam may be used in the dispenser 10 to control loading and unloading of substrates to and from the dispenser. The gantry 24 can be moved using motors under the control of the controller 18 to position the dispensing units 14, 16 at predetermined locations over the substrate. The dispenser 10 may include a display unit 28 connected to the controller 18 for displaying various information to an operator. There may be an optional second controller for controlling the dispensing units.

Prior to performing a dispensing operation, as described above, the substrate, e.g., printed circuit board, must be aligned or otherwise in registration with a dispenser of the dispensing system. The dispenser further includes a vision system 30, which is coupled to a vision system gantry 32 movably coupled to the frame 20 for supporting and moving the vision system. Although shown separately from the dispensing unit gantry 24, the vision system gantry 32 may utilize the same gantry system as the dispensing units 14, 16. As described, the vision system 30 is employed to verify the location of landmarks, known as fiducials or other features and components, on the substrate. Once located, the controller can be programmed to manipulate the movement of one or both of the dispensing units 14, 16 to dispense material on the electronic substrate.

Systems and methods of the present disclosure are directed to the construction of the dispensing units 14, 16. The description systems and methods provided herein reference exemplary electronic substrates (e.g., printed circuit boards), which are supported on the support 22 of the dispenser 10. In one embodiment, the dispense operation is controlled by the controller 18, which may include a computer system configured to control material dispensers. In another embodiment, the controller 18 may be manipulated by an operator.

Figure 2:
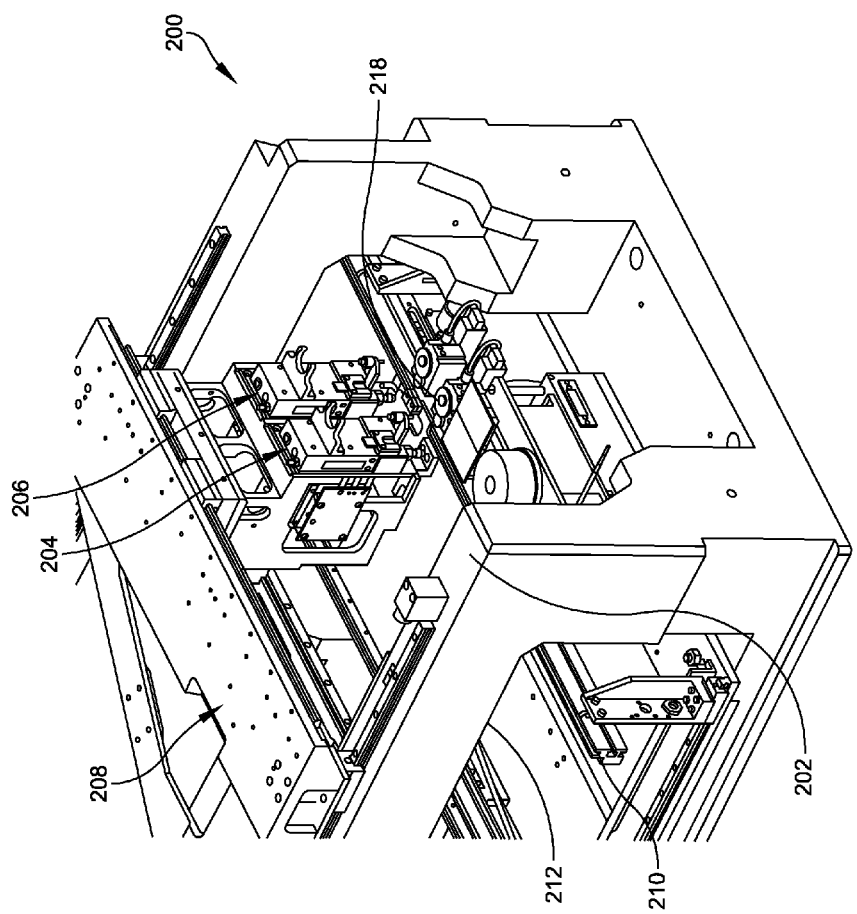
FIG. 2 is a perspective view of a portion of a dispenser of an embodiment of the disclosure.

Referring to FIG. 2, an exemplary material deposition system, generally indicated at 200, may be configured from a XYFLEXPRO® dispenser platform offered by Speedline Technologies, Inc. of Franklin, Mass., a subsidiary of the assignee of the present disclosure. In one embodiment, the material deposition system 200 includes a frame 202 that supports components of the material deposition system, including but not limited to a controller, such as controller 18, which is located in a cabinet of the material deposition system. As shown, the material deposition system 200 further includes two deposition or dispensing units, generally indicated at 204 and 206, for depositing low viscous materials (e.g., less than 50 centipoise), semi-viscous materials (e.g., 50-100 centipoise), viscous materials (e.g., 100-1000 centipoise), and/or high viscous materials (e.g., greater than 1000 centipoise). The deposition units 204, 206 may be movable along orthogonal axes by a gantry system, generally indicated at 208, under the control of the controller 18 to allow dispensing of the material on the circuit board, such as substrate 12, which, as mentioned above, may sometimes be referred to as an electronic substrate or a circuit board. A cover (not shown) may be provided but is not shown so as to reveal the internal components of the material deposition system 200, including the deposition units 204, 206 and the gantry system 208. Although two deposition units 204, 206 are shown and described, any number of deposition units may be provided and fall within the scope of the present disclosure.

Circuit boards, such as substrates 12, which are fed into the material deposition system 200, typically have a pattern of pads or other surface areas onto which material will be deposited. The material deposition system 200 also includes a conveyor system 210 that is accessible through an opening 212 provided along each side of the material deposition system to transport the circuit board in an x-axis direction to a depositing position in the material deposition system. When directed by the controller of the material deposition system 200, the conveyor system 210 supplies circuit boards to a dispense location under the deposition units 204, 206. Once arriving at the position under the deposition units 204, 206, the circuit board is in place for a manufacturing operation, e.g., a deposition operation.

The material deposition system 200 further includes a vision inspection system, such as the vision system 30 shown in FIG. 1, that is configured to align the circuit board and to and inspect the material deposited on the circuit board. In one embodiment, the vision inspection system is secured to one of the deposition units 204, 206 or to the gantry system 208. To successfully deposit material on the circuit board, the circuit board and the deposition units 204, 206 are aligned, via the controller 18. Alignment is accomplished by moving the deposition units 204, 206 and/or the circuit board based on readings from the vision inspection system. When the deposition units 204, 206 and the circuit board are aligned correctly, the deposition units are manipulated to perform a deposition operation. After the deposition operation, optional inspection of the circuit board by means of the vision inspection system may be performed to ensure that the proper amount of material has been deposited and that the material has been deposited at the proper locations on the circuit board. The vision inspection system can use fiducials, chips, board apertures, chip edges, or other recognizable patterns on the circuit board to determine proper alignment. After inspection of the circuit board, the controller controls movement of the circuit board to the next location using the conveyor system, where a next operation in the board assembly process may be performed, for example electrical components may be placed on the circuit board or the materials deposited on the board may be cured.

In some embodiments, the material deposition system 200 may operate as follows. The circuit board may be loaded into the material deposition system 200 in a depositing position using the conveyor system. The circuit board is aligned with the deposition units 204, 206 by using the vision inspection system. The deposition units 204, 206 may then be initiated by the controller 18 to perform a deposit operation in which material is deposited at precise locations on the circuit board. Once the deposition units 204, 206 have performed a depositing operation, the circuit board may be transported by the conveyor system from the material deposition system 200 so that a second, subsequent circuit board may be loaded into the material deposition system. The disposition units 204, 206 may be constructed to be quickly removed and replaced with other units.

Figure 3:
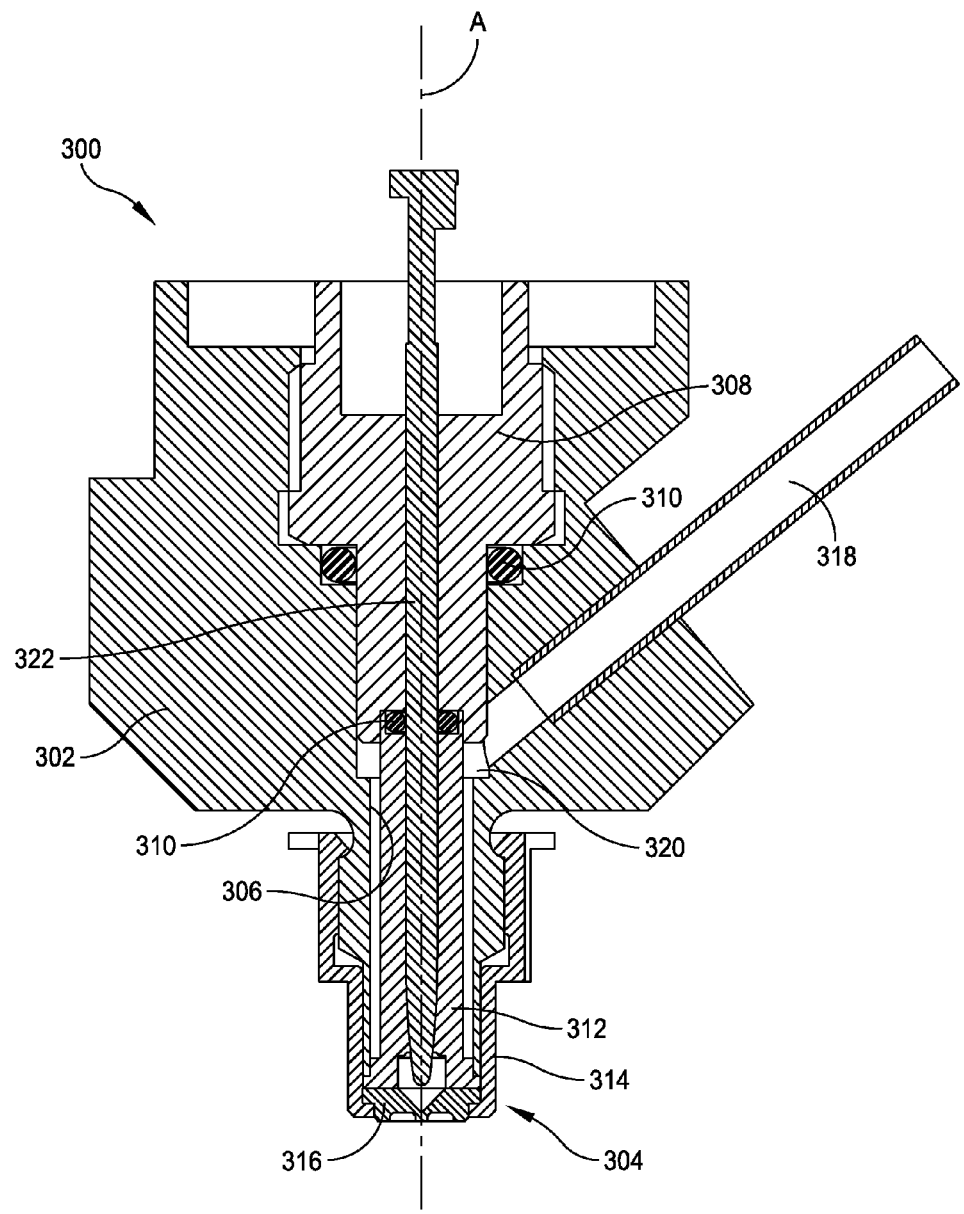
FIG. 3 is a cross-sectional view of a dispensing unit of the dispenser of an embodiment of the disclosure.

Referring to FIG. 3, a dispensing unit, generally indicated at 300, of an embodiment of the present disclosure is shown and will be described below. As shown the dispensing unit 300 includes a housing 302 and a nozzle assembly, generally indicated at 304, which is releasably secured to the housing. Specifically, the dispenser housing 302, which is coupled to an actuator along axis A, is configured to define an elongate chamber 306, which is designed to receive viscous material for dispensing. A seal nut 308 and suitable seals 310 secure an upper portion of a piston guide or chamber structure 312 within the chamber 306 of the housing 302. A lower portion of the piston guide 312 is secured by the nozzle assembly 304, which includes a nozzle nut 314 and a valve seat 316 upon which the lower portion of the piston guide 312 rests. The cylindrical chamber 306 defines a dispensing cavity that is in fluid communication with a material feed tube 318, which is adapted to receive material from a material supply assembly. As shown, the material feed tube 318 introduces viscous material within the chamber 306 at the upper portion of the piston guide 312 through an inlet 320. As will be described in greater detail below, the viscous material is delivered to the chamber 306 to the small dispensing cavity under pressure. The dispensing unit 300 further includes a reciprocating piston 322 that is partially disposed within the seal nut 308 and the piston guide 312. The piston 322 has an upper end that is biased by a yoke in a downward manner by a spring and a plunger, which is actuated by the actuator, and a lower end configured to engage the valve seat 316. The piston 322 is configured to be received and slidably moved within the chamber 306 along axis A.

Figure 4:
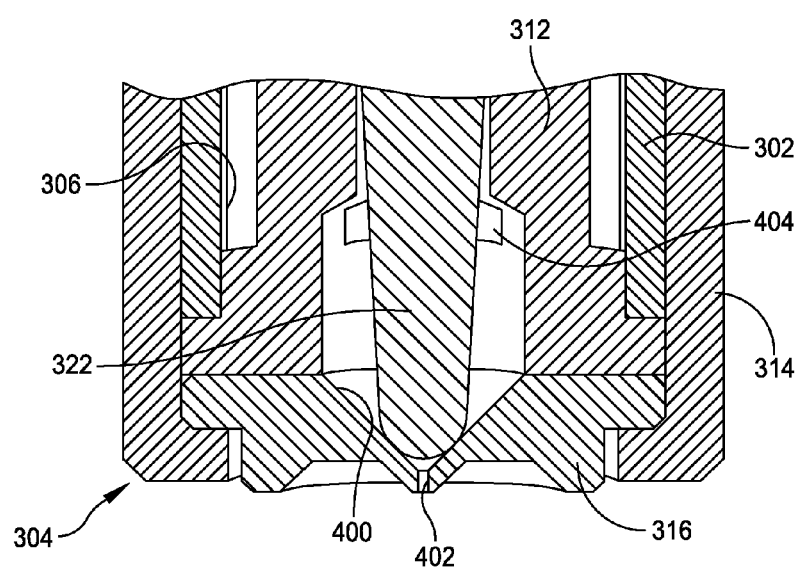
FIG. 4 is an enlarged cross-sectional view of a nozzle of the dispensing unit shown in FIG. 3.

Referring to FIG. 4, the lower portion of the dispensing unit 300 is illustrated. As shown, the nozzle nut 314 is threadably secured to a lower portion of the housing 302 and configured to secure the valve seat 316 between the nozzle nut and the lower end of the piston guide 312. The valve seat 316 includes a generally cylindrical member having a conical surface 400 and a small-diameter bore 402, e.g., 0.005 inches in diameter, formed therein. In one embodiment, the valve seat 316 may be fabricated from a hard material, such as synthetic sapphire. The arrangement is such that viscous material is ejected from the small-diameter bore 402 onto a substrate, e.g., circuit board 12, when the piston 322 engages the valve seat 316. In a particular embodiment, the nozzle assembly 304 may be provided as a complete assembly to the end user of the dispenser 300 to aid in cleaning of the nozzle assembly. Specifically, a used nozzle assembly 304 may be completely removed from the housing 302 of the dispensing unit 300 by unscrewing the needle nut 314 and replaced with a new (clean) nozzle assembly.

In operation, the reciprocating piston 322 is moveable between an upper position and a lower position within the piston guide 312 provided within the chamber 306 of the housing 302. The dispensing medium, e.g., solder paste, is introduced under pressure into the chamber 306 through the inlet 320 and the dispensing material flows through slits 404 formed in the piston guide 312 to an open space above the valve seat 316. In the lower position, the piston 322 is seated against the valve seat 316 and in the upper position, the piston is raised out of the valve seat of the nozzle assembly. As described below, the actuator assembly includes one of a piezoelectric actuator or a voice coil motor, which is coupled to the piston 322, and operation of the actuator assembly (via a flexure assembly) causes the movement of the piston between the upper and lower positions. When the piston 322 moves to its lowered position against the valve seat 316, a small drop of material is dispensed through the small diameter bore 402 formed in the valve seat.

As discussed, the dispensing unit 300 provides pressurized air to the source of dispensing material to introduce the material into the housing of the dispensing unit by the material feed tube 318. The particular pressure provided may be selected based on the material being used, volume of material being dispensed, and mode of operation of the dispensing unit 300. During operation of the dispenser, a user, through the user interface for the dispensing platform, defines dispensing areas on a circuit board. The dispensing unit 300 may be used to dispense dots and lines of material. When the dispensing unit 300 is used to dispense lines of material formed through multiple dispensing cycles of the dispenser and is used to dispense material at selected locations on a circuit board or other substrate using an individual dispensing cycle. For lines of material, a user defines the start and stop positions of a line, and the dispensing platform is able to move the dispensing unit 300 to place material along the line. Once all dispensing areas on a circuit board are defined and the dispensing parameters set using a dispensing unit control panel, the dispenser is able to receive circuit boards for processing. After moving a circuit board to a dispensing location, the dispenser controls the gantry system 208 to position the dispensing unit over a dispensing location. In another embodiment, the circuit board may be moved under a stationary dispensing unit. Dispensing for a particular board will continue until material has been dispensed at all locations on the board. The board is then unloaded from the system and a new board can be loaded into the system.

Figure 5:
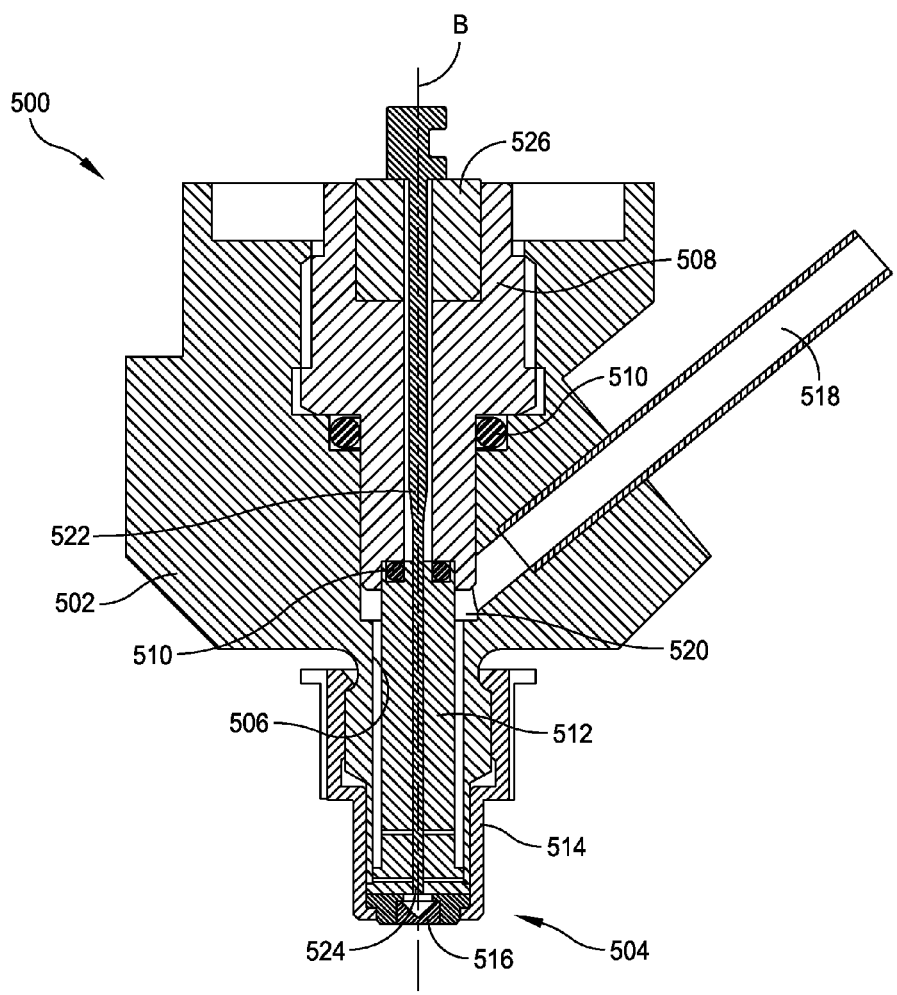
FIG. 5 is a cross-sectional view of a dispensing unit of the dispenser of another embodiment of the disclosure.

Referring to FIG. 5, a dispensing unit, generally indicated at 500, of another embodiment of the present disclosure is shown and will be described below. As shown the dispensing unit 500 includes a housing 502 and a nozzle assembly, generally indicated at 504, which is releasably secured to the housing. Specifically, the dispenser housing 502, which is coupled to an actuator along axis B, is configured to define an elongate chamber 506 configured to receive viscous material for dispensing. A seal nut 508 and suitable seals 510 secure an upper portion of a piston guide 512 within the chamber 506 of the housing 502. A lower portion of the piston guide 512 is secured by the nozzle assembly 504, which includes a nozzle nut 514 and a nozzle 516 configured to be held by the nozzle nut. The chamber 506 defines a small dispensing cavity that is in fluid communication with a material feed tube 518, which is adapted to receive material from a material supply assembly. As shown, the material feed tube 518 introduces viscous material within the chamber 506 at the upper portion of the piston guide 512 through an inlet 520. As will be described in greater detail below, the viscous material is delivered to the chamber 506 under pressure. The dispensing unit 500 further includes a piston 522 that is disposed within the seal nut 508 and the piston guide 512. The piston 522 has an upper end secured to an actuator by a flexure assembly, and a lower end configured to move into and out of a small orifice 524 formed in the lower portion of the piston guide 512. The piston 522 is configured to be received and slidably moved within the cylindrical chamber along axis B. A stop 526 is provided within a recess formed in the seal nut 508. The stop 526, which may be formed from compliant material, engages a head of the piston 522 to stop the downward movement of the piston 522 during a dispense operation.

Figure 6:
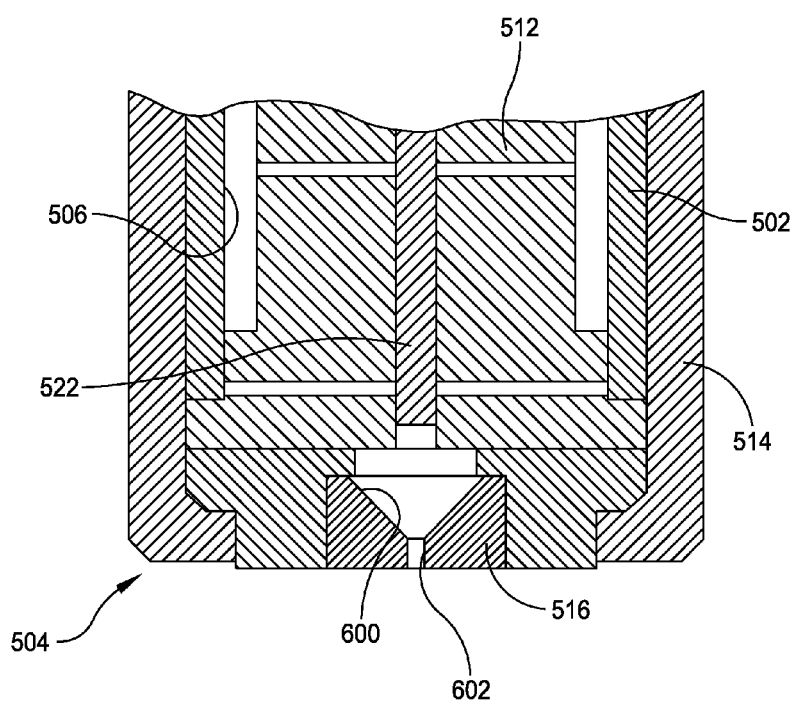
FIG. 6 is an enlarged cross-sectional view of a nozzle of the dispensing unit shown in FIG. 5.

Referring to FIG. 6, the lower portion of the dispensing unit 500 is illustrated. As shown, the lower end of the piston 522 is configured to move through the small orifice 524 so that it ends up in a position above the nozzle 516. The nozzle 516 includes a generally cylindrical member having a conical surface 600 and a small-diameter bore 602, e.g., 0.005 inches in diameter, formed therein. In one embodiment, the nozzle 516 may be fabricated from a hard material, such as synthetic sapphire. The arrangement is such that viscous material is ejected from the small-diameter bore 602 onto a substrate, e.g., circuit board 12, when the piston 522 displaces the material provided within the space above the nozzle 516 and below the end portion of the piston guide 512. In a particular embodiment, the nozzle assembly 504 may be provided as a complete assembly to the end user of the dispenser to aid in cleaning of the nozzle assembly. Specifically, a used nozzle assembly may be completely removed from the dispensing unit 500 by unscrewing the needle nut and replaced with a new (clean) nozzle assembly.

Figure 7:
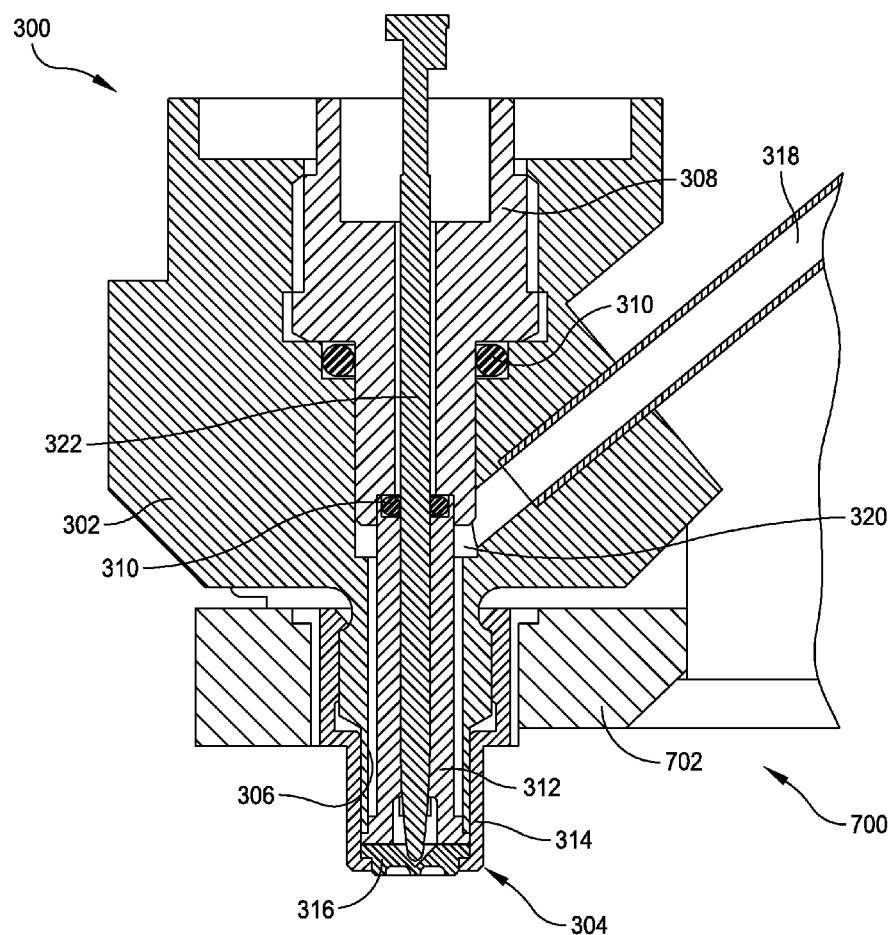
FIG. 7 is a cross sectional view of the dispensing unit shown in FIG. 3 having a heated assembly mounted on a housing of the dispensing unit.

Referring to FIG. 7, an optional nozzle heater assembly, generally indicated at 700, may be used with the dispensing unit, e.g., dispensing unit 300, and a temperature of the nozzle heater assembly may be set using a user interface that is coupled to the controller 18. It should be noted that the optional nozzle heater assembly 700 may be used for dispensing unit 500 and fall within the scope of the present disclosure. The nozzle heater assembly 700 is controlled by the system to maintain the heater at a set temperature. The nozzle heater assembly 700 is constructed to be attached to the lower portion of the housing 302 of the dispensing unit, e.g., the nozzle nut 314 as shown in FIG. 7, to provide heat to the material above the valve seat 316. In one embodiment, the nozzle heater assembly 700 includes a body 702, which includes a cartridge heater, a temperature sensor, and mounting hardware. The body 702 has a lower opening through which the lower portion of the dispensing unit 300, i.e., the nozzle assembly 304, extends. Clamps may be provided to secure the nozzle heater assembly 700 to the dispensing unit 300 by compressing the body 702 housing against the nozzle nut 314 of the nozzle assembly 304. The cartridge heater and the temperature sensor may be coupled to the system controller, which maintains the temperature in the vicinity of the temperature sensor to a set value.

Figure 8A:
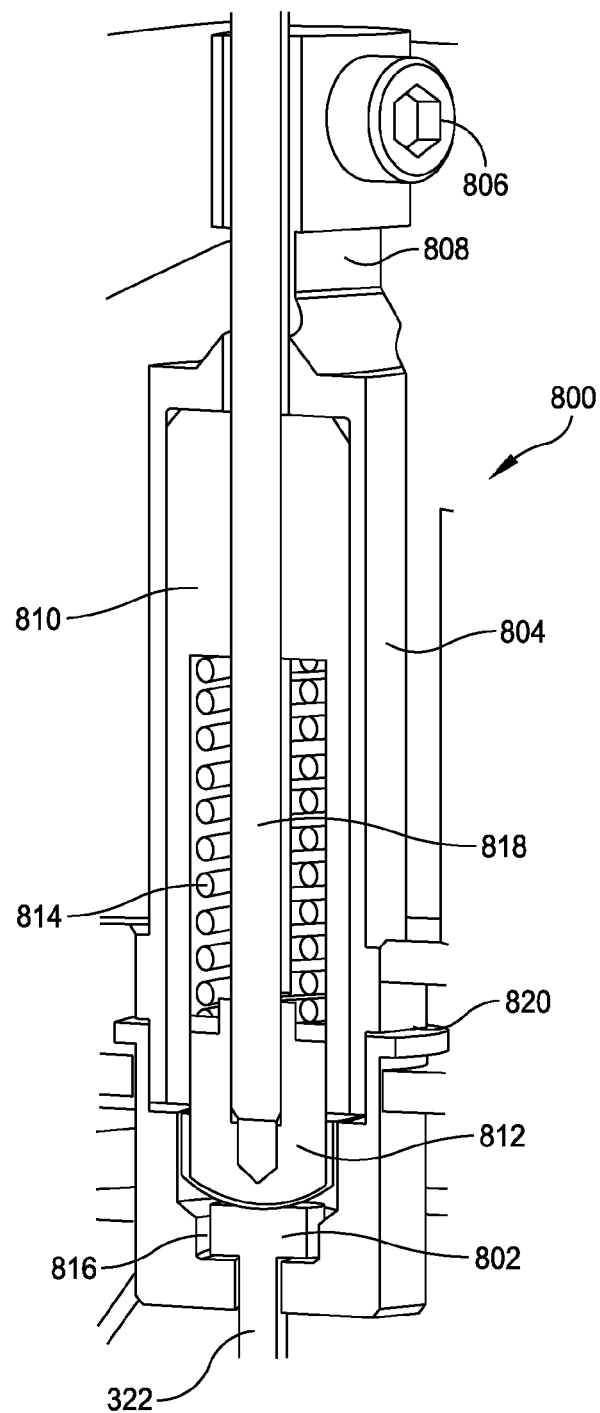
FIG. 8A is a cross-sectional view of a portion of an actuator assembly configured to operate the dispensing unit shown in FIGS. 3 and 4.

Referring to FIG. 8A, in one embodiment, the upper end of the piston 322 is secured to a compliant flexure assembly, sometimes referred to as a compliant assembly, generally indicated at 800, which is configured to secure the piston to the actuator assembly to provide reciprocating axial movement of the piston. As shown, the upper end of the piston 322 includes a head portion 802. The compliant flexure assembly 800 includes a generally cylindrical flexure housing 804, which may be secured to a lever arm of a piezoelectric actuator assembly by a screw 806. In another embodiment, the compliant flexure assembly 800 may be secured to a voice coil motor actuator assembly. The flexure housing 804 includes a reduced thickness portion or flexure element 808, which enables the flexure assembly 800 to accommodate the arcuate motion of the lever arm of the piezoelectric actuator assembly as it drives the reciprocal motion of the flexure assembly and the piston 322.

The flexure assembly 800 further includes a spring housing 810 disposed within the flexure housing 804, a plunger 812 disposed within the spring housing at a lower end of the spring housing and axially movable within the spring housing, and a spring 814 disposed between the spring housing and the plunger. The plunger 812 includes yoke fingers 816 configured to capture the head portion 802 of the piston 322. The compliant flexure assembly 800 further includes a rod 818 disposed within the flexure housing 804 and the spring housing 810, the rod having a lower end that is secured to the plunger 812. The arrangement is such that the plunger 812 of the flexure assembly 800 is configured to apply a downward bias on the head portion 802 of the piston 322.

Specifically, during operation of the dispensing unit 300, the actuator assembly drives the up-and-down movement of the flexure assembly 800 and the piston 322. During a downward stroke in which the piston 322 engages the valve seat 316, the actuator assembly and flexure assembly 800 has a tendency to continue driving downwardly even though the piston has abruptly stopped moving. During this motion, the plunger 812 engages the head portion 802 of the piston 322 and the spring 814 is compressed within the spring housing 810 as the flexure housing 804 continues its downward movement. When the piston 322 is in a sealed position within the valve seat 316, the spring 814 is configured to bias the plunger 812 downwardly to firmly seat the piston within the valve seat, thereby closing the dispensing unit 300.

The flexure assembly 800 may further include a second flexure element 820 disposed about the flexure housing 804 at a lower end of the flexure housing. In one embodiment, the second flexure element 820 may embody a spider flexure that enables two degrees of movement, e.g., vertical and pitch, which further assists in accommodating the arcuate motion of the lever arm of the piezoelectric actuator assembly as it drives the up-and-down movement of the piston 322.

Figure 8B:
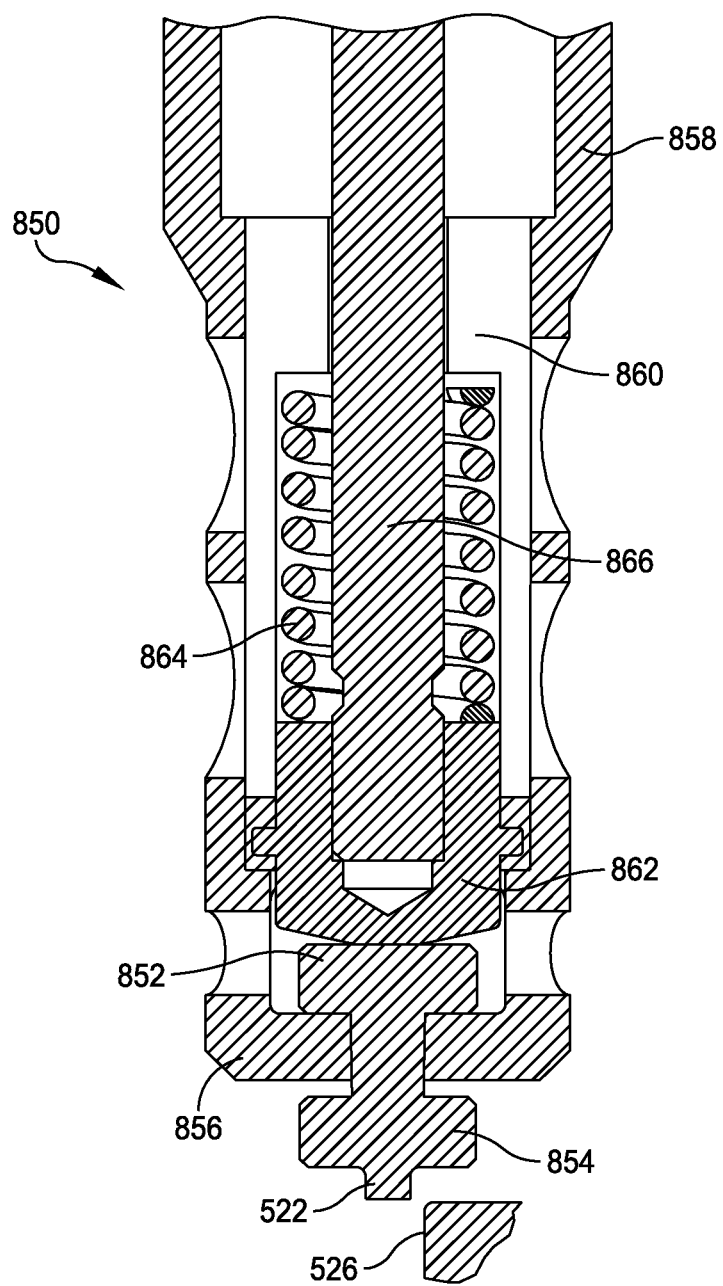
FIG. 8B is a cross-sectional view of a portion of an actuator assembly configured to operate the dispensing unit shown in FIGS. 5 and 6.

Referring to FIG. 8B, in another embodiment, the upper end of the piston 522 is secured to a compliant flexure assembly, sometimes referred to as a compliant assembly, generally indicated at 850, which is configured to secure the piston to an actuator assembly, such as the piezoelectric actuator assembly, to provide reciprocating axial movement of the piston. As with flexure assembly 800, the flexure assembly 850 may be secured to a voice coil motor actuator assembly. As shown, the upper end of the piston 522 includes two spaced-apart head portions 852, 854. The flexure assembly 850 includes a yoke 856 that is constructed to secure the upper head portion 852 of the piston 522 within the space between the two head portions 852, 854 of the piston. The flexure assembly 850 further includes a generally cylindrical flexure housing 858, which is operated by the actuator assembly. For the piezoelectric actuator assembly, the flexure housing 858 may include a reduced thickness portion or flexure element (not shown in FIG. 8B), which enables the flexure assembly 850 to accommodate the arcuate motion of the lever arm as it drives the reciprocal motion of the flexure assembly and the piston 522.

The flexure assembly 850 further includes a spring housing 860 disposed within the flexure housing 858, a plunger 862 disposed within the spring housing at a lower end of the spring housing and axially movable within the spring housing, and a spring 864 disposed between the spring housing and the plunger. The arrangement is such that a lower end of a rod 866 is secured to the plunger 862 to provide the axial movement of the piston 522 within the spring housing 858 as described above. A stop 526 may be provided to stop the movement of the piston 522 by engaging the lower head portion 854 of the piston. The arrangement is such that the plunger 862 of the flexure assembly 850 is configured to apply a downward bias on the head portion 852 of the piston 522. Specifically, during operation of the dispensing unit 500, the actuator assembly drives the up-and-down movement of the flexure assembly 850 and the piston 522. During a downward stroke in which the head portion 854 of the piston 522 engages the stop 526, the actuator assembly and flexure assembly 850 has a tendency to continue driving downwardly even though the piston has abruptly stopped moving. During this motion, the plunger 862 engages the head portion 852 of the piston 522 and the spring 864 is compressed within the spring housing 860 as the flexure housing 858 continues its downward movement.

Figure 9:
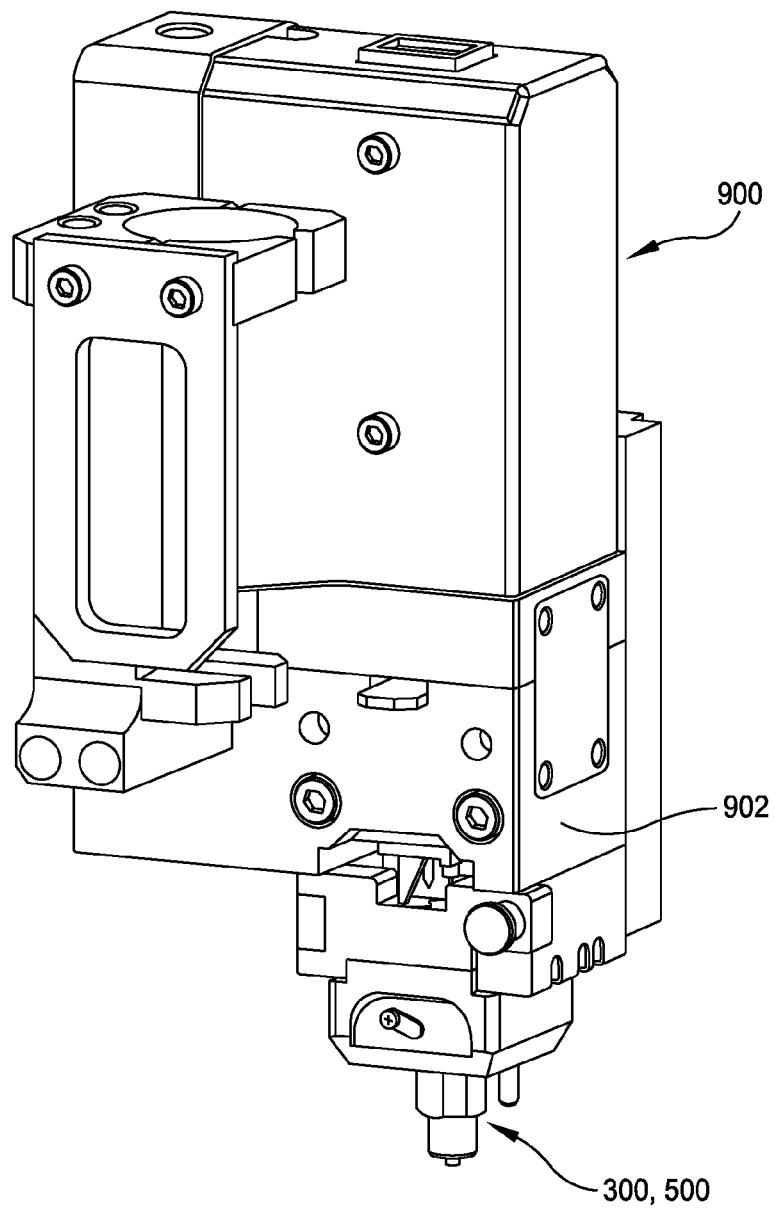
FIG. 9 is a perspective view of a piezoelectric actuator assembly operating the dispensing unit shown in FIG. 3.

FIG. 9 illustrates a piezoelectric actuator assembly, generally indicated at 900, operating a dispensing unit 300, 500 of embodiments of the present disclosure. As shown, the piezoelectric actuator assembly 900 includes a housing 902 configured to secure the dispensing unit 300, 500 thereto. The housing 902 of the piezoelectric actuator assembly 900 is suitably secured to the gantry 208 to move the dispensing unit during a dispensing operation.

Figure 10:
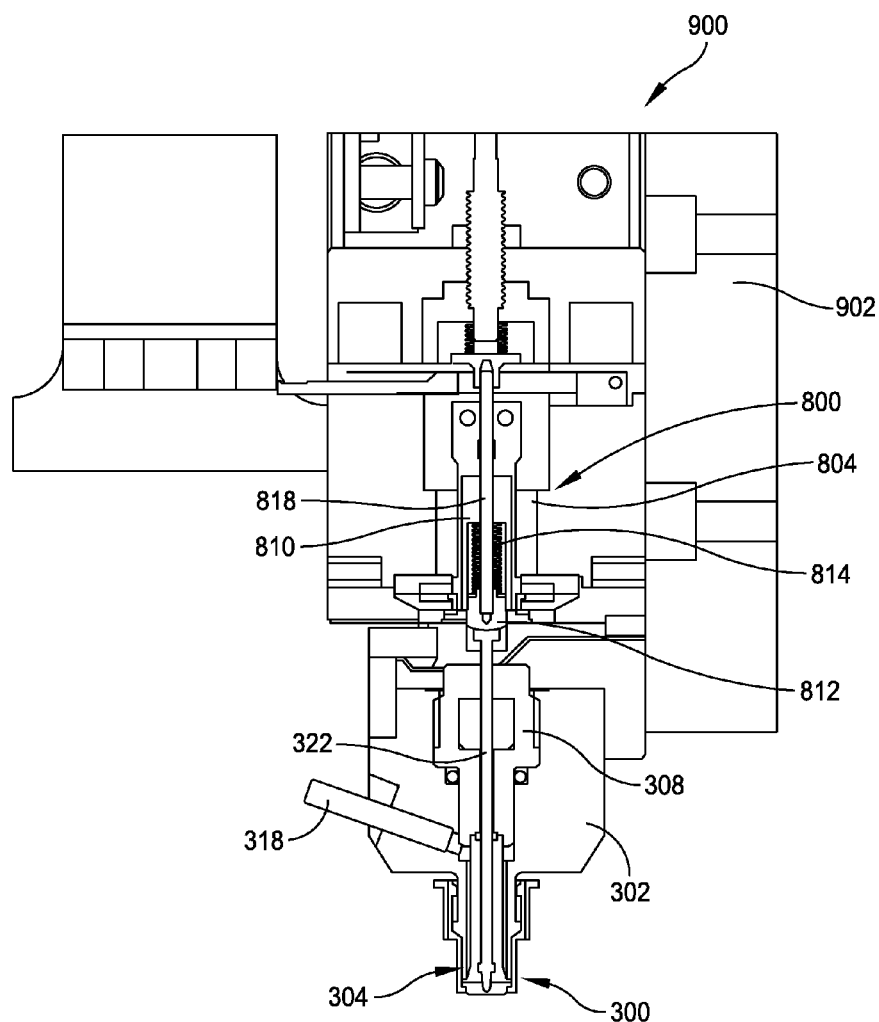
FIG. 10 is a cross-sectional view with cross-hatching removed to more clearly illustrate the piezoelectric actuator assembly shown in FIG. 9.
Figure 11:
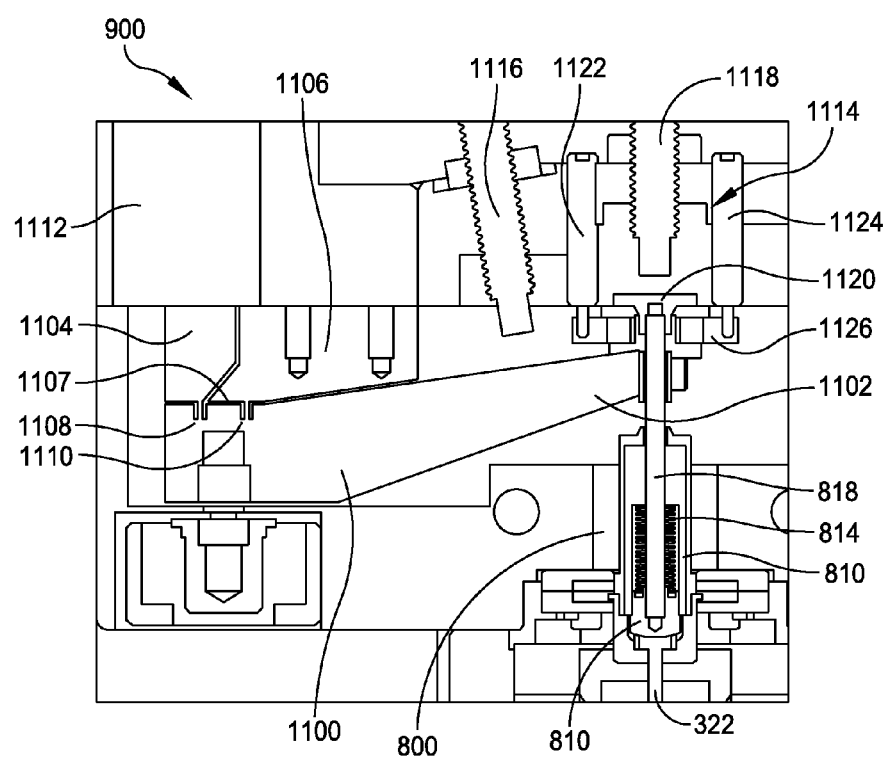
FIG. 11 is another cross-sectional view with cross-hatching removed to more clearly illustrate the piezoelectric actuator assembly shown in FIG. 9.

Referring to FIGS. 10 and 11, the piezoelectric actuator assembly 900 is shown with dispensing unit 300. It should be understood that the piezoelectric actuator assembly 900 may be used with dispensing unit 500 and fall within the scope of the present disclosure. The housing 902 of the piezoelectric actuator assembly 900 is configured to support the components of the piezoelectric actuator assembly. As shown, the piezoelectric actuator assembly is secured to the flexure assembly 800 to effect the rapid up-and-down movement of the piston 322. Specifically, the piezoelectric actuator assembly 900 includes a lever arm 1100 having an end portion 1102 configured to be secured to the upper end of the flexure housing 804 of the flexure assembly 800. The piezoelectric assembly further includes a piezoelectric stack interface block 1104, a mounting block 1106, and a hinge 1107 disposed between the lever arm 1100 and the interface block 1104 and the mounting block. The hinge 1107 includes two pivot points 1108, 1110 that enable the lever arm 1100 to rock or pivot with respect to the up-and-down movement of the interface block 1104. The interface block 1104 is moved in an up-and-down direction by a piezoelectric stack 1112, which is positioned above the interface block. In one embodiment, the result is that the piezoelectric stack 1112 is capable of moving the interface block a distance of 65 microns (0.065 millimeters). The movement of the interface block 1104 via the lever arm 1100 causes the axial movement of the flexure assembly to be 650 microns (0.65 millimeters). The piezoelectric stack can operate at a speed up to 1,000 Hertz. The flexure assembly 800 is configured to address any unwanted lateral movement of the piston 322 as the piston reciprocates in an up-and-down movement. Thus, the piezoelectric actuator assembly 900 is capable of translating the movement of the piezoelectric stack 1112 to produce up-and-down movement of the flexure assembly 800, which in turn produces the up-and-down movement of the piston 322.

The piezoelectric actuator assembly 900 further includes a sensor assembly generally indicated at 1114 to provide a closed-loop detection of the movement of the piezoelectric actuator assembly. Specifically, the sensor assembly 1114 includes a lever arm sensor 1116 configured to detect a target provided on the lever arm 1100 to determine the movement of the lever arm 1100, and a rod sensor 1118 configured to detect a target provided on an upper end of the rod to determine the movement of the rod 818. The lever arm sensor 1116 is secured to the housing 902 and is positioned a predetermined distance from the target provided on the lever arm 1100. This predetermined distance or gap is detected by the lever arm sensor 1116 to determine the amount of movement of the lever arm 1100 during operation. Similarly, the rod sensor 1118 is secured to the housing 902 and is positioned a predetermined distance from the target on the rod 818. This predetermined distance or gap is detected by the rod sensor 1118 to determine the amount of movement of the rod 818 during operation. With the rod sensor 1118, the upper end of the rod 818 has a sensor target 1120 to provide an object for the rod sensor to detect.

The sensor assembly 1114 may be used as part of a control system to provide feed-forward control of the reciprocating motion of the piston. An adaptive routine may be provided that can vary drive signals used to drive the actuator assembly to ensure a desired motion profile is achieved, even as operating parameters, such as viscosity, vary. For example, viscosity of the material can change with time and temperature. This change in viscosity may cause a load on the actuator assembly to change, and thus alter an actual motion achieved. By sensing this change in motion profile, subsequent drive signals can be adjusted as required to maintain a desired motion profile. Since these operating parameter changes tend to drift slowly with time and temperature, the feed-forward adaptive routine can track these variations in real time. This is different in nature from a feed-back control system, in which the drive signal is varied in real time at the full bandwidth of the system. The adaptation in the feed-forward control system only needs to adapt at rates faster than the variations for which it is intended to compensate. An overwhelming advantage of feed-forward control systems is that unlike feed-back control systems, they can be designed to be unconditionally stable.

The upper end of the rod 818 is further connected to a plunger assembly having two ball plungers 1122, 1124 and a release lever 1126 connected to the ball plungers. The two ball plungers 1122, 1124 force the release lever 1126 out of the way (down) during regular operation. With the release lever 1126 out of the way, the dispensing unit can operate freely with no restrictions of the range of motion. When the dispensing unit is released, power is dropped from the piezoelectric stack 1112 the lever arm 1100 moves to a known location. To release the piston, the compliance spring 814 of the flexure assembly 800 is compressed to free up the head 802 of the piston 322. This is achieved by lifting up on the release lever 1126, which compresses the ball plungers 1122, 1124. There are two sets of screws (not designated) provided on the release lever 1126. The two sets of screws lift up on the bottom of a target, which in turn lifts on the rod 818, which lifts on the plunger 812, which finally compresses the spring 814 and frees up the piston 322.

Figure 12:
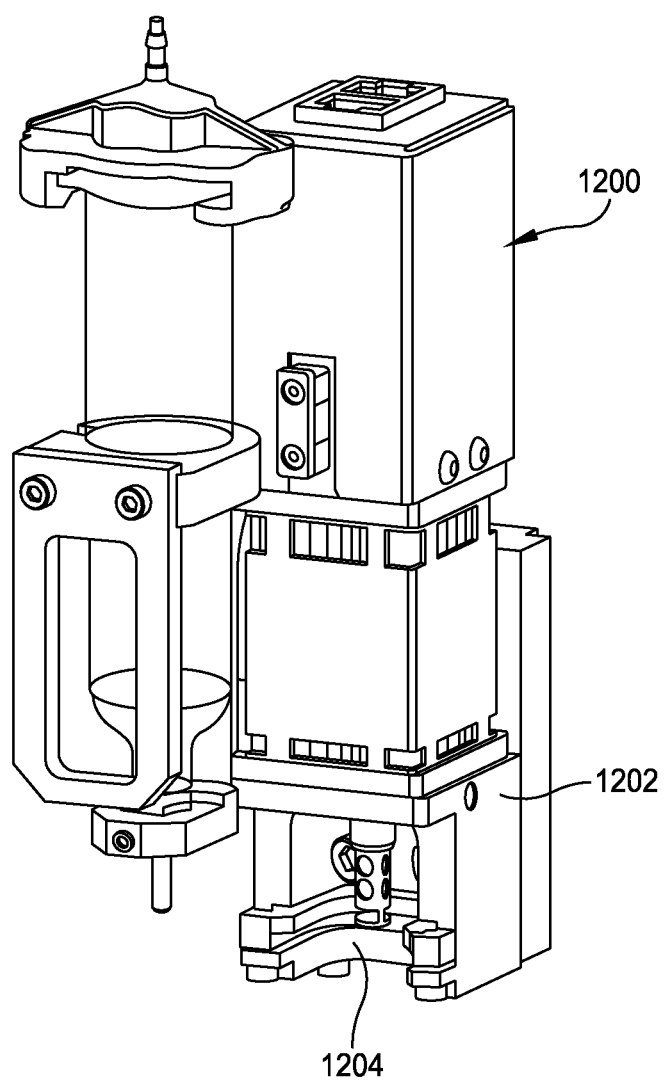
FIG. 12 is a perspective view of a voice coil motor actuator assembly.

In another embodiment, a voice coil motor actuator assembly may be provided to operate the dispensing unit, e.g., dispensing unit 300 or 500. The voice coil motor actuator assembly is well known in the art and may be suitably coupled to the dispensing unit to drive the operation of the piston 322 or 522. For example, FIG. 12 illustrates a voice coil motor actuator assembly, generally indicated at 1200, operating a dispensing unit, e.g., dispensing unit 300 or 500. As shown, the voice coil motor actuator assembly 1200 includes a housing 1202 configured to secure the dispensing unit thereto at location 1204. The housing 1202 of the voice coil motor actuator assembly 1200 is suitably secured to the gantry 208 to move the dispensing unit during a dispensing operation. In one embodiment, the voice coil motor actuator assembly may include a three coil/3 pole/2 magnet motor.

In operation, the dispensing unit 300 or 500 is positioned at a nominal clearance height above the substrate, e.g., circuit board 12. This clearance height is maintained at a relatively consistent elevation above the circuit board throughout the dispense operation, although variations in the height of the circuit board, or irregularities in the flatness of the top surface of the circuit board, may cause the clearance height to vary without adversely impacting the dispensing of viscous material. Specifically, the dispenser unit does not need to lift the nozzle away from the circuit board in the z-axis direction at the end of each dispense operation. However, to accommodate variations in the height of the circuit board and irregularities in the flatness of the circuit board (or to even avoid obstacles), the dispenser may be configured to achieve z-axis movement. In certain embodiments, a laser detection system may be used to determine a height of the dispenser.

Thus, it should be observed that a feature of the present disclosure is the axial compliance of the compliant flexure assembly 800. This compliance permits the piston 322 to stop abruptly when it contacts the valve seat 316, or when the lower head portion 854 of the piston 522 contacts the stop 526, while permitting additional motion of the flexure assembly 800 past this point of contact. The compliant flexure assembly 800 permits limited relative travel between the actuator assembly (via the flexure housing 804) and the piston 322 or 522. This decoupling of motion reduces the shock loads to the actuator assembly, increases the rapidity with which the piston may be decelerated, and in some modes of operation, permits a more energy efficient operation by converting the kinetic energy of the flexure assembly to potential energy in the compressed compliance spring, and subsequently recovering this potential energy as kinetic energy of the actuator as the spring works to accelerate the actuator in the opposite direct. As shown and described, the compliant flexure assembly 800 is further configured to extend a length of the assembly, i.e., the plunger 812 or 862, to an extended position. The compliant flexure assembly 800 has a stiffness of compliance. The compliant flexure assembly 800 is configured to vary a stiffness of compliance as a function of relative motion between the actuator and the piston.

In a certain embodiment, the dispenser may be based on an existing platform, such as platform dispensing systems that are offered under the brand names FX-D and Xyflex-Pro+, and operates using dispensing software, such as software that is offered under the brand name Benchmark, which are offered by Speedline Technologies, Inc. of Franklin, Mass., a subsidiary of the assignee of the disclosure.

A method of operating a dispenser to dispense a volume of viscous material on a substrate is further disclosed. The dispensing unit may be dispensing unit 300 or 500, which is coupled to actuator assembly 900 or 1200. In one embodiment, the method includes connecting a piezoelectric actuator assembly 900 to the piston. The piezoelectric actuator assembly 900 is configured to drive the up- and down movement of the piston. The method further includes activating a piezoelectric stack 1112 to drive the up-and-down movement of a flexure assembly 800 and a piston 322. In a certain embodiment, the piezoelectric stack 1112 operates at a speed between zero and 1,000 Hertz. The method may further include limiting unwanted lateral movement of the piston 322 as the piston reciprocates in an up-and-down movement by the flexure assembly 800. The method may further include sensing the movement of the actuator assembly to provide closed loop operation of the dispenser. The method further may include controlling the operation of the piezoelectric actuator assembly with a controller 18. The controller 18 is configured to move the piston 322 from a pre-dispense position in which viscous material is introduced into the chamber 306 to a dispense position in which the piston dispenses viscous material from the chamber and through the valve seat 316.

Alternate embodiments of the present disclosure may include various mechanisms to accomplish the compliant advantages of the compliant flexure assembly 800. For example, one embodiment may incorporate hydraulic components to vary the stiffness of compliance as a function of the relative velocity between the housing 804 and the plunger 812. An example of this type of mechanism is a hydraulic valve lifter as used in modern internal combustion engines.

Having thus described at least one embodiment of the disclosure, various alternations, modifications and improvements will readily occur to those skilled in the art. Such alterations, modifications and improvements are intended to be within the scope and spirit of the disclosure. Accordingly, the foregoing description is by way of example only and is not intended to be limiting. The limit is defined only in the following claims and equivalents thereto.

What is claimed is:

1. A method of operating a dispenser to dispense material on a substrate, the dispenser comprising a dispensing unit including a housing having a chamber, a piston disposed in the chamber and axially movable within the chamber, and a nozzle coupled to the housing, the nozzle having an orifice co-axial with the chamber of the housing, an actuator coupled to the dispensing unit and configured to drive the up- and down movement of the piston, and a compliant assembly separate from the actuator, the method comprising:

permitting limited relative travel between the actuator and the piston wherein the compliant assembly is secured to the piston and to the actuator assembly to provide reciprocating axial movement of the piston in response to the actuator, the compliant assembly including a flexure housing secured to the lever arm of the actuator and coupled to the piston to permit limited relative travel between the actuator and the piston during operation.

2. The method of claim 1, further comprising biasing a length of the compliant assembly to an extended position.

3. The method of claim 1, wherein the actuator is a piezoelectric actuator assembly.

4. The method of claim 1, wherein the actuator is a voice coil motor.

5. The method of claim 1, wherein the piston stops when a tip of the piston engages a seat, the method further comprising permitting further travel of the actuator subsequent to the engagement of the piston against the seat.

6. The method of claim 1, wherein the piston stops when a feature of the piston engages a stop, the method further comprising permitting further travel of the actuator subsequent to the engagement of the piston against the stop.

7. The method of claim 1, further comprising varying a stiffness of compliance as a function of relative motion between the actuator and the piston.

8. The method of claim 1, further comprising sensing a position of the actuator.

9. The method of claim 8, further comprising sensing a position of the piston.

10. The method of claim 8, further comprising controlling the actuator by providing a feed-forward adaptive routine to utilize sensor data from the sensor and the feed-forward adaptive routine to control motion of the actuator to achieve a desired actuator motion profile.

11. The method of claim 1, further comprising sensing a position of the piston.

12. The method of claim 11, further comprising controlling the actuator by providing a feed-forward adaptive routine to utilize sensor data from the sensor and the feed-forward adaptive routine to control motion of the actuator to achieve a desired actuator motion profile.

* * * * *